(12) United States Patent
Han et al.

(10) Patent No.: US 10,440,206 B2
(45) Date of Patent: Oct. 8, 2019

(54) FAX FUNCTION DIAGNOSIS METHOD, AND APPARATUS FOR PERFORMING THE METHOD

(71) Applicant: HP PRINTING KOREA CO., LTD., Suwon-si, Gyeonggi-Do (KR)

(72) Inventors: Chang-min Han, Ansan-si (KR); In-soo Sung, Suwon-si (KR); Cheol-yon Won, Seoul (KR); Ho-sung Han, Suwon-si (KR)

(73) Assignee: HP Printing Korea Co., Ltd., Suwon-si (KR)

( * ) Notice: Subject to any disclaimer, the term of this patent is extended or adjusted under 35 U.S.C. 154(b) by 213 days.

(21) Appl. No.: 15/608,207

(22) Filed: May 30, 2017

(65) Prior Publication Data

US 2018/0176394 A1 Jun. 21, 2018

(30) Foreign Application Priority Data

Dec. 15, 2016 (KR) .................. 10-2016-0171673

(51) Int. Cl.
*H04N 1/00* (2006.01)
*H04N 1/32* (2006.01)

(52) U.S. Cl.
CPC ..... *H04N 1/00344* (2013.01); *H04N 1/00061* (2013.01); *H04N 1/00079* (2013.01); *H04N 1/32625* (2013.01)

(58) Field of Classification Search
CPC ............ G06F 11/2221; H04N 1/00029; H04N 1/00031; H04N 1/00061; H04N 1/00066; H04N 1/00079; H04N 1/00344; H04N 1/32625
See application file for complete search history.

(56) References Cited

U.S. PATENT DOCUMENTS

| 5,396,342 | A  | * | 3/1995 | Meyer ................ H04N 1/00002 358/406 |
| 7,421,496 | B2 | * | 9/2008 | Motoyama .............. H04L 51/30 709/219 |
| 7,698,605 | B2 | * | 4/2010 | Wachi ................. G06F 11/0709 709/224 |
| 8,174,710 | B2 | * | 5/2012 | Nagarajan .......... G03G 15/5079 358/1.14 |
| 8,693,062 | B2 | * | 4/2014 | Roantree .............. H04N 1/0001 358/1.15 |
| 9,083,827 | B2 | * | 7/2015 | Koue .................... H04N 1/0022 |
| 9,276,807 | B2 | * | 3/2016 | Nasir .................. H04L 41/5074 |
| 2007/0067681 | A1 | * | 3/2007 | Hikawa .............. H04N 1/00344 714/47.1 |

(Continued)

FOREIGN PATENT DOCUMENTS

| JP | 2002-330297 A | 11/2002 |
| JP | 2008228110 A | 9/2008 |
| KR | 1996-0036508 A | 10/1996 |

*Primary Examiner* — Joseph R Kudirka
(74) *Attorney, Agent, or Firm* — Jefferson IP Law, LLP

(57) ABSTRACT

A fax function diagnosis method and an apparatus for performing the method are provided. The fax function diagnosis method includes receiving a diagnosis request to diagnose a fax function of an image forming apparatus, diagnosing the fax function of the image forming apparatus by transmitting or receiving a test page, and performing an operation based on a result of the diagnosing.

18 Claims, 12 Drawing Sheets

(56) References Cited

U.S. PATENT DOCUMENTS

| | | |
|---|---|---|
| 2009/0031039 A1 | 1/2009 | Min |
| 2009/0031052 A1 | 1/2009 | Pothos et al. |
| 2010/0110468 A1 | 5/2010 | Nagarajan et al. |
| 2012/0200898 A1 | 8/2012 | Roantree et al. |
| 2018/0150268 A1* | 5/2018 | Choi .................... G06F 3/1204 |

* cited by examiner

FAX FUNCTION DIAGNOSIS METHOD, AND APPARATUS FOR PERFORMING THE METHOD

CROSS-REFERENCE TO RELATED APPLICATION(S)

This application claims the benefit under 35 U.S.C. § 119(a) of a Korean patent application filed on Dec. 15, 2016 in the Korean Intellectual Property Office and assigned Serial number 10-2016-0171673, the entire disclosure of which is hereby incorporated by reference.

TECHNICAL FIELD

The present disclosure relates to a fax function diagnosis method, and an apparatus for performing the method.

BACKGROUND

In many cases, when a fax transmission or reception problem occurs, it is not easy to determine whether the problem is a problem in a fax machine, a problem in a fax line environment, or a problem in an opposite fax machine, and thus a user may not easily determine an appropriate solution.

Furthermore, when a problem occurs in a fax machine or a fax line environment, an ordinary user having no technical knowledge may not be able to solve the problem by himself or herself.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a fax function diagnosis method capable of improving user convenience by easily making a diagnosis request to diagnose a fax function of an image forming apparatus, and performing an appropriate operation based on a diagnosis result, and an apparatus for performing the method.

In accordance with an aspect of the present disclosure, a fax function diagnosis method is provided. The fax function diagnosis method includes receiving a diagnosis request to diagnose a fax function of an image forming apparatus, diagnosing the fax function of the image forming apparatus by transmitting or receiving a test page, and performing an operation based on a result of the diagnosing.

In accordance with another aspect of the present disclosure, a fax function diagnosis apparatus is provided. The fax function diagnosis apparatus includes a communicator configured to receive a diagnosis request to diagnose a fax function of an image forming apparatus, a fax unit configured to support a fax transmission and reception function, and at least one processor configured to control the fax unit to transmit or receive a test page to diagnose the fax function when the diagnosis request is received, and perform an operation based on a result of the diagnosing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiment of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
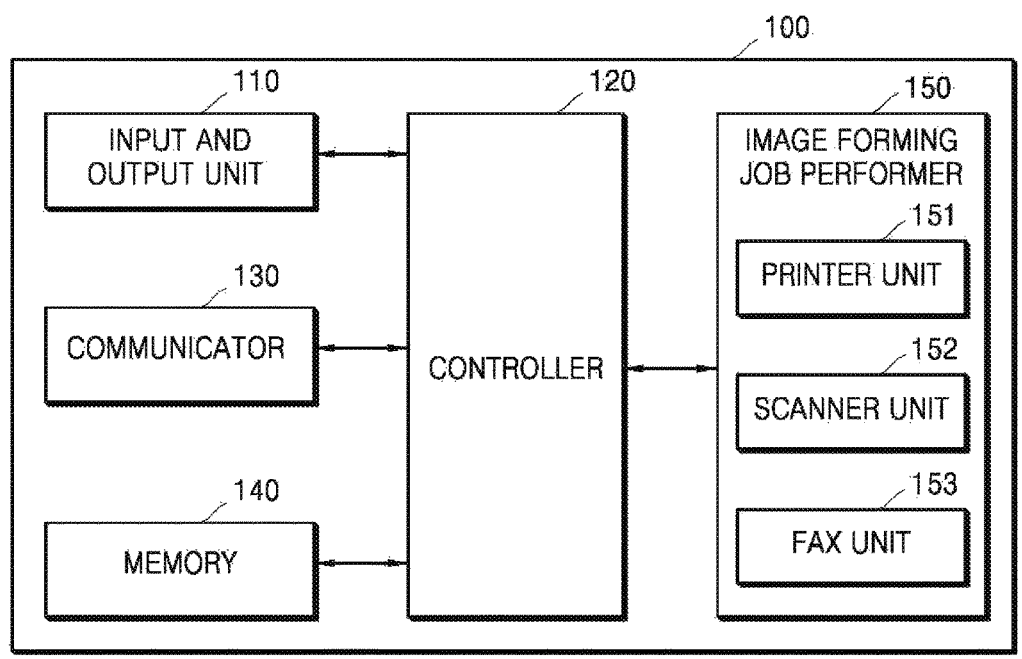
FIG. 1 is a block diagram of an image forming apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and construction may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the specification, when an element is "connected" to another element, the elements may not only be "directly connected", but may also be "electrically connected" via another element therebetween. Also, when a region "includes" an element, the region may further include another element instead of excluding the other element, unless otherwise differently stated.

In the specification, an "image forming job" may denote any one of various jobs (e.g., printing, copying, scanning, or faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a scanner, a fax machine, a multi-function printer (MFP), or a display apparatus.

Also, a "hard copy" may denote an operation of printing an image on a print medium, such as a paper, and a "soft copy" may denote an operation of printing an image on a display device, such as a television (TV) or a monitor.

Also, "content" may denote any type of data that is a target of an image forming job, such as a picture, an image, or a document file.

Also, "print data" may denote data having a format printable by a printer.

Also, a "scan file" may denote a file generated by scanning an image by using a scanner.

Also, a "user" may denote a person who performs manipulation related to an image forming job by using an image forming apparatus or a device connected to the image forming apparatus wirelessly or via wires. Also, a "manager" may denote a person who has authority to access all functions and a system of an image forming apparatus. A "manager" and a "user" may be the same person.

A method of diagnosing a fax function of an image forming apparatus, and an apparatus for performing the method will now be described in detail with reference to the drawings. The fax function may be diagnosed by a diagnosis server. For example, an image forming apparatus having a fax function may be used as the diagnosis server, and a program for diagnosing the fax function may be installed in the image forming apparatus used as the diagnosis server.

Alternatively, the diagnosis server may be embedded in the image forming apparatus subject to diagnosis.

The diagnosis server may receive a diagnosis request to diagnose the fax function, from a mobile device of a user or a service engineer via an email. Alternatively, the diagnosis server may receive the diagnosis request via a diagnosis application executed in the mobile device of the user or the service engineer. Otherwise, when the image forming apparatus subject to diagnosis is used as the diagnosis server, the diagnosis server may directly receive the diagnosis request from the user.

Various embodiments mentioned above will be described later in detail with reference to FIGS. 4 to 10.

FIG. 1 is a block diagram of an image forming apparatus according to an embodiment of the present disclosure.

Referring to FIG. 1, an image forming apparatus 100 according to an embodiment may include an input and output unit 110, a controller 120, a communicator 130, a memory 140, and an image forming job performer 150. Also, although not illustrated in FIG. 1, the image forming apparatus 100 may further include a power supplier for supplying power to each component of the image forming apparatus 100.

The input and output unit 110 may include an input unit for receiving, from a user, an input for performing an image forming job, and an output unit for displaying information, such as a result of performing an image forming job or a state of the image forming apparatus 100. For example, the input and output unit 110 may include an operation panel for receiving a user input and a display panel for displaying a screen.

In detail, the input unit may include at least one of devices for receiving various types of user inputs, such as a keyboard, a physical button, a touch screen, a camera, and a microphone. Also, the output unit may include, for example, a display panel or a speaker. However, various embodiments are not limited thereto, and the input and output unit 110 may include at least one device supporting various inputs and outputs.

When the image forming apparatus 100 is used as a diagnosis server according to an embodiment, the image forming apparatus 100 may directly receive a diagnosis request from a user through the input and output unit 110.

The controller 120 controls overall operations of the image forming apparatus 100, and may include at least one processor, such as a central processing unit (CPU). The controller 120 may control other components included in the image forming apparatus 100 such that an operation corresponding to a user input received through the input and output unit 110 is performed.

For example, the controller 120 may execute a program stored in the memory 140, read a file stored in the memory 140, or store a new file in the memory 140.

The controller 120 may change settings related to a fax function, based on a diagnosis result received from a diagnosis server, and thus solve a problem related to the fax function. For example, if the received diagnosis result includes information about a problem currently occurring in relation to the fax function, and a setting value to be changed to solve the occurring problem, the controller 120 may change the settings based on the included setting value.

When the image forming apparatus 100 is used as the diagnosis server according to an embodiment, a diagnosis server for diagnosing the fax function may be embedded in the controller 120. For example, a diagnosis program may be installed in the memory 140, and the controller 120 may execute the diagnosis program installed in the memory 140.

When the image forming apparatus 100 is used as the diagnosis server, the controller 120 may perform diagnosis based on a diagnosis request, and perform an operation based on the diagnosis result. For example, the controller 120 may perform an operation for solving a problem indicated by the diagnosis result.

The communicator 130 may communicate with another device or a network in a wired or wireless manner. Accordingly, the communicator 130 may include a communication module supporting at least one of various wired and wireless communication methods. For example, the communication module may be in a form of a chipset or may be a sticker or a barcode (e.g., a sticker including a near field communication (NFC) tag) including information required for communication.

Wireless communication may include, for example, at least one of Wi-Fi, Wi-Fi direct, Bluetooth (BT), ultra wideband (UWB), and NFC. Wired communication may include, for example, at least one of universal serial bus (USB) and high definition multimedia interface (HDMI).

Figure 2:
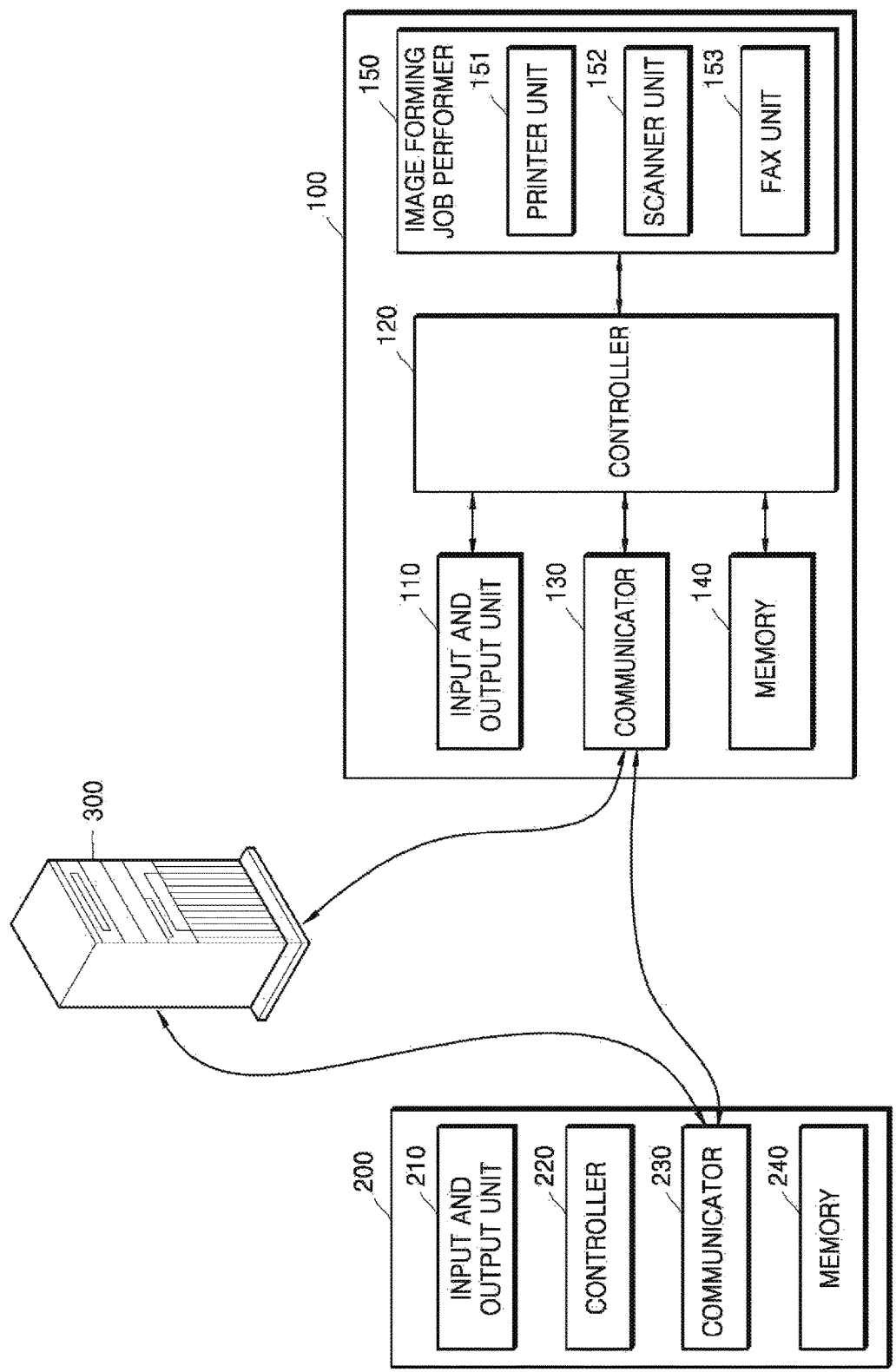
FIG. 2 is a diagram showing an environment in which an image forming apparatus is connected to a mobile device according to an embodiment of the present disclosure.

FIG. 2 is a diagram showing an environment in which an image forming apparatus is connected to a mobile device according to an embodiment of the present disclosure.

The communicator 130 may be connected to an external apparatus, e.g., a mobile device 200, provided outside the image forming apparatus 100 to transmit and receive a signal or data to and from the mobile device 200. Referring to FIG. 2, the image forming apparatus 100 is connected to the mobile device 200 through the communicator 130. The communicator 130 may transmit a signal or data received from the mobile device 200 to the controller 120, or transmit a signal or data generated by the controller 120 to the mobile device 200. For example, when the communicator 130 receives a print command signal or print data from the mobile device 200, the controller 120 may output the print data through a printer unit 151.

According to an embodiment, an application related to diagnosis of the fax function may be installed and executed in the mobile device 200 of the user of the image forming apparatus 100 to transmit a diagnosis request to the diagnosis server based on user input or to receive a diagnosis result from the diagnosis server.

Referring to FIG. 2, the mobile device 200 may include an input and output unit 210, a controller 220, a communicator 230, and a memory 240. The mobile device 200 may receive a diagnosis request to diagnose the fax function, from the user through the input and output unit 210, and the communicator 230 may transmit the diagnosis request to the diagnosis server. In this case, the diagnosis request may be transmitted via an email or an application. The controller 220 may control an image forming job by executing a program stored in the memory 240 and transmitting a signal or data generated as a result of executing the program to the image forming apparatus 100 through the communicator 230. An application related to diagnosis of the fax function may be installed in the memory 240, and executed by the controller 220. The mobile device 200 may include, for example, a smartphone or a tablet.

The communicator 130 may be directly connected to a diagnosis server 300 for diagnosing the fax function, and transmit and receive a signal or data to and from the diagnosis server 300. According to an embodiment, the communicator 130 may transmit a diagnosis request to the diagnosis server 300, or receive a diagnosis result from the diagnosis server 300.

Alternatively, when the image forming apparatus 100 is used as the diagnosis server according to an embodiment, the communicator 130 may transmit a diagnosis result to a mobile device of a user or a service engineer.

Referring back to FIG. 1, the various types of data, such as a file or a program like an application, may be installed and stored in the memory 140. The controller 120 may access the data stored in the memory 140 to use the data, or may store new data in the memory 140. Also, the controller 120 may execute the program installed in the memory 140. Also, the controller 120 may install an application received from an external source through the communicator 130 in the memory 140.

When the image forming apparatus 100 is used as the diagnosis server according to an embodiment, a diagnosis program for diagnosing the fax function may be installed in the memory 140.

The image forming job performer 150 may perform an image forming job, such as printing, scanning, or faxing.

The image forming job performer 150 includes the printer unit 151, a scanner unit 152, and a fax unit 153, but as occasion demands, the image forming job 150 may include some of them or may further include a component for performing another type of image forming job.

The printer unit 151 may form an image on a recording medium via any one of various printing methods, such as an electrophotography method, an inkjet method, a thermal transfer method, and a thermal method.

The scanner unit 152 may irradiate light onto paper and receive light reflected from the paper to read an image recorded on the paper. Examples of an image sensor for reading an image from paper include a charge-coupled device (CCD) and a contact type image sensor (CIS). The scanner unit 152 may have a flatbed structure in which paper is located at a fixed location and an image sensor moves to read an image, a document feed structure in which an image sensor is located at a fixed location and paper is transferred, or a combination structure thereof.

The fax unit 153 may share a component for scanning an image with the scanner unit 152, share a component for printing a received file with the printer unit 151, transmit a scan file to a destination, or receive a file from an external source.

The fax unit 153 may receive a test page from the diagnosis server when the diagnosis server transmits the test page to diagnose the fax function, or may transmit a test page to the diagnosis server when the user makes a request to transmit the test page from the image forming apparatus 100 to the diagnosis server.

When the image forming apparatus 100 is used as the diagnosis server according to an embodiment, the fax unit 153 may transmit or receive a test page to or from another fax machine based on a request of the controller 120.

Figure 3:
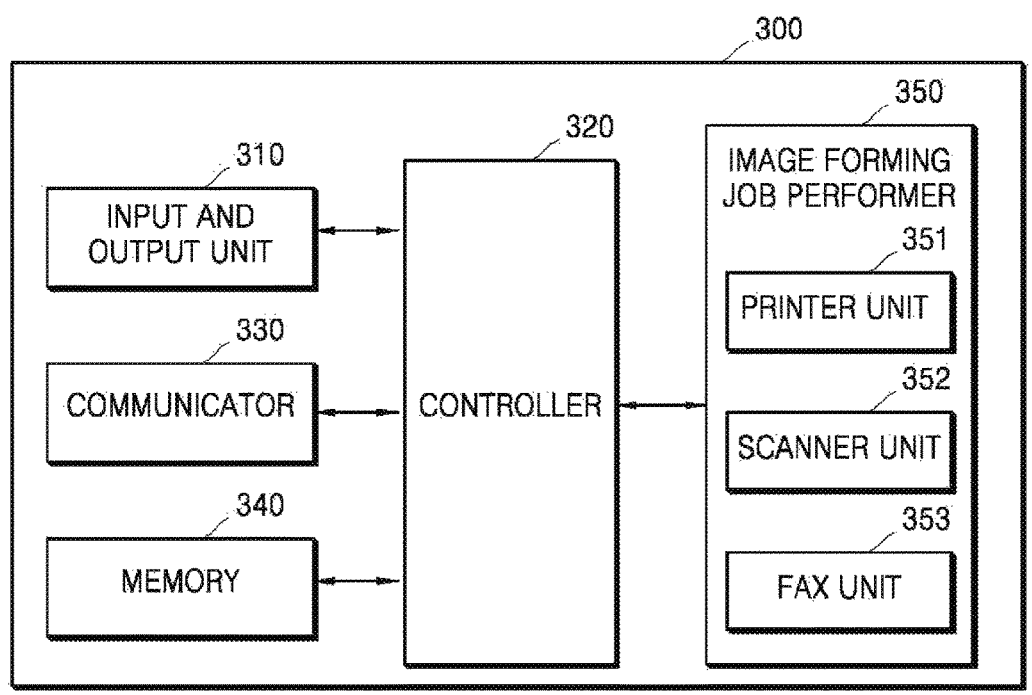
FIG. 3 is a block diagram of a diagnosis server for diagnosing a fax function according to an embodiment of the present disclosure.

FIG. 3 is a block diagram of a diagnosis server for diagnosing a fax function according to an embodiment of the present disclosure.

As described above, an image forming apparatus having the fax function may be used as a diagnosis server and, in this case, a program for diagnosing the fax function may be installed in the image forming apparatus. The image forming apparatus used as the diagnosis server may be located in a service center for providing an after-sales service for image forming apparatuses subject to diagnosis. Alternatively, a general server or a personal computer (PC) other than the image forming apparatus may be used as the diagnosis server and, in this case, the server or the PC may have a diagnosis program installed therein and support the fax function.

Referring to FIG. 3, a diagnosis server 300 according to an embodiment may include an input and output unit 310, a controller 320, a communicator 330, a memory 340, and an image forming job performer 350. The image forming job performer 350 may include a printer unit 351, a scanner unit 352, and a fax unit 353.

General descriptions of the components included in the image forming apparatus 100 of FIG. 1 may be equally applied to the components included in the diagnosis server 300.

The following description is focused on diagnosis server operations and characteristics.

The communicator 330 may receive a diagnosis request to diagnose the fax function, from a mobile device of a user or a service engineer. Alternatively, the communicator 330 may receive the diagnosis request from the image forming apparatus 100 subject to diagnosis. According to an embodiment, the communicator 330 may receive the diagnosis request via an email. Alternatively, the communicator 330 may receive the diagnosis request via an application executed in the mobile device of the user or the service engineer.

The communicator 330 may transmit a diagnosis result to the mobile device of the user or the service engineer. Alternatively, the communicator 330 may transmit the diagnosis result to the image forming apparatus 100 subject to diagnosis. In this case, the communicator 330 may transmit the diagnosis result to the mobile device or the image forming apparatus 100 via an email or an application.

The communicator 330 may transmit the diagnosis result and a problem solution request to a service provider of a public switched telephone network (PSTN).

The memory 340 may store a program for diagnosing the fax function.

The controller 320 may diagnose the fax function of the image forming apparatus 100 by executing the program stored in the memory 340. For example, the controller 320 may perform diagnosis based on a diagnosis item and a fax number subject to diagnosis, which are included in the diagnosis request received through the communicator 330. In this case, the fax number subject to diagnosis may be a fax number of the image forming apparatus 100 subject to diagnosis. If the diagnosis item indicates 'reception', the controller 320 attempts to transmit a test page to the fax number subject to diagnosis. Otherwise, if the diagnosis item indicates 'transmission', the controller 320 receives a test page from the fax number subject to diagnosis. According to an embodiment, when the diagnosis request is received via an email, the controller 320 may extract the diagnosis item and the fax number subject to diagnosis by parsing a title of the email, and perform diagnosis based on the extracted diagnosis item and the fax number.

The controller 320 may perform an operation corresponding to the diagnosis result. According to an embodiment, if the diagnosis result indicates that a problem solvable by the image forming apparatus 100 subject to diagnosis directly changing settings has occurred, the controller 320 may transmit the diagnosis result to the image forming apparatus 100 through the communicator 330. Otherwise, if the diagnosis result indicates that a problem solvable by the service engineer has occurred, the controller 320 may transmit the diagnosis result to the mobile device of the service engineer through the communicator 330. Otherwise, if the diagnosis result indicates that a problem has occurred in the PSTN, the controller 320 may transmit a problem solution request to the service provider of the PSTN through the communicator 330. Otherwise, if the diagnosis result indicates that a problem directly solvable by the user of the image forming apparatus 100 subject to diagnosis has occurred, the controller 320 may transmit the diagnosis result to the mobile device of the user through the communicator 330.

According to another embodiment, the controller 320 may transmit the diagnosis result to the image forming apparatus 100 via an email if the image forming apparatus 100 supports email reception, and transmit the diagnosis result to the mobile device of the user or the service engineer via an email if the image forming apparatus 100 supports email reception.

The fax unit 353 may transmit or receive a test page to or from the image forming apparatus 100 subject to diagnosis, under the control of the controller 320.

Various embodiments of a fax function diagnosis method will now be described with reference to FIGS. 4 to 10.

Figure 4:
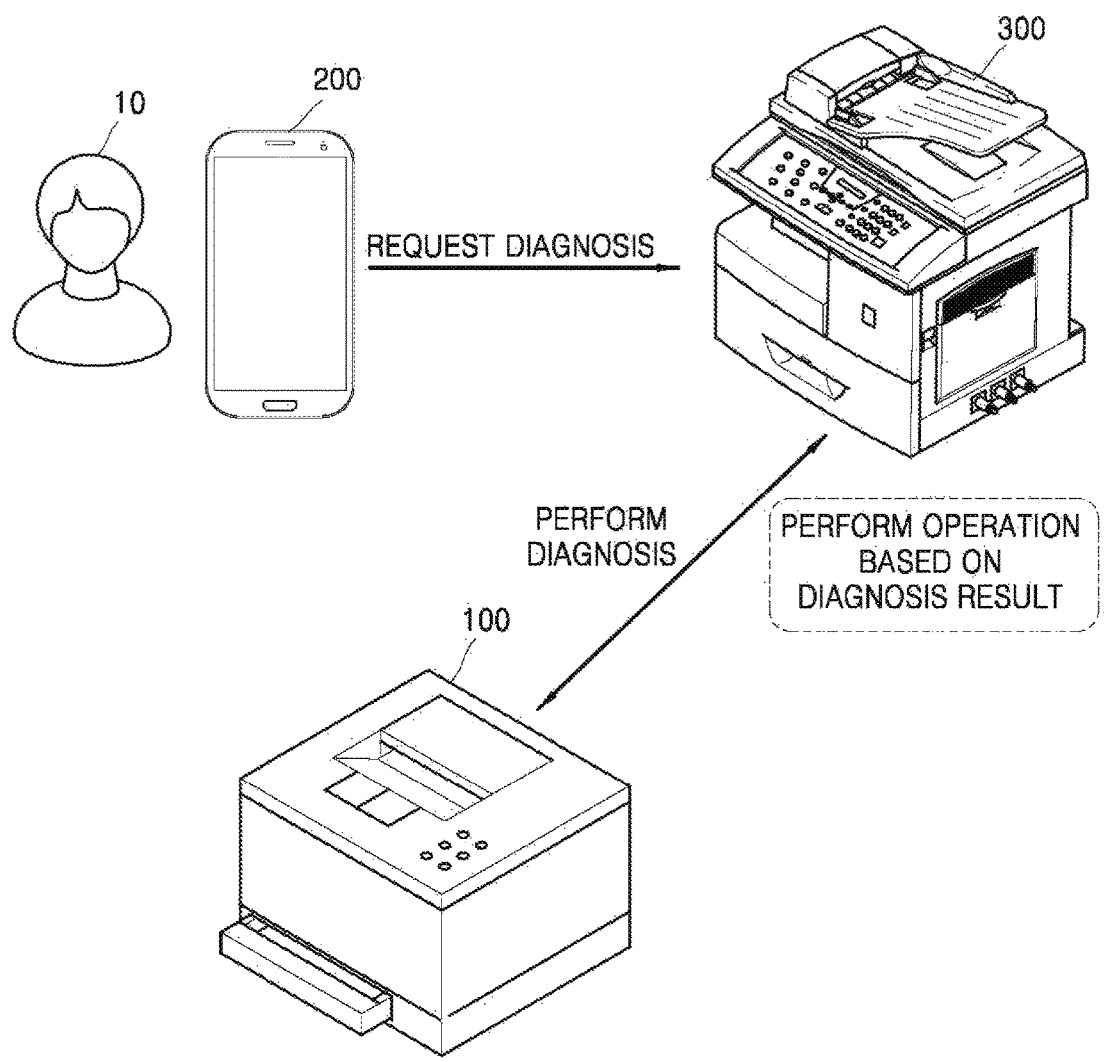
FIG. 4 is a diagram for describing a fax function diagnosis method and, more particularly, a diagram showing an embodiment in which a diagnosis server receives a diagnosis request from a mobile device of a user according to an embodiment of the present disclosure.

FIG. 4 is a diagram for describing a fax function diagnosis method and, more particularly, a diagram showing an embodiment in which a diagnosis server receives a diagnosis request from a mobile device of a user according to an embodiment of the present disclosure.

Referring to FIG. 4, a user 10 of the image forming apparatus 100 subject to diagnosis may make a diagnosis request to diagnose a fax function of the image forming apparatus 100, by using the mobile device 200, and the mobile device 200 may transmit the diagnosis request to the diagnosis server 300.

The user 10 may select to transmit the diagnosis request via an email. When an email is used, the user 10 may include a diagnosis item and a fax number subject to diagnosis, in a title of the email. For example, if an image forming apparatus having a fax number of "1234-xxxx" is subject to diagnosis in terms of 'transmission', the user 10 may send an email titled "[FAX DIAGNOSTICS TX] 1234-xxxx". Otherwise, if an image forming apparatus having a fax number of "1234-xxxx" is subject to diagnosis in terms of 'reception', the user 10 may send an email titled "[FAX DIAGNOSTICS RX] 1234-xxxx". The title of the email is not limited thereto and may be determined in various ways to include the diagnosis item and the fax number. Instead of the title, a body of the email may include the diagnosis item and the fax number.

Alternatively, the user 10 may make the diagnosis request via an application executed in the mobile device 200.

When the diagnosis request is received from the mobile device 200, the diagnosis server 300 may diagnose the fax function by transmitting or receiving a test page to or from the image forming apparatus 100.

When the diagnosis request is received, the diagnosis server 300 may send a confirmation letter to the mobile device 200 of the user 10. The confirmation letter may include a fax number of the diagnosis server 300 and a list of diagnosis requests which are currently being processed.

When the fax function is completely diagnosed, the diagnosis server 300 may perform an operation based on the diagnosis result. Examples of the operation performed by the diagnosis server 300 based on the diagnosis result will be now described with reference to FIGS. 5 to 8.

Figure 5:
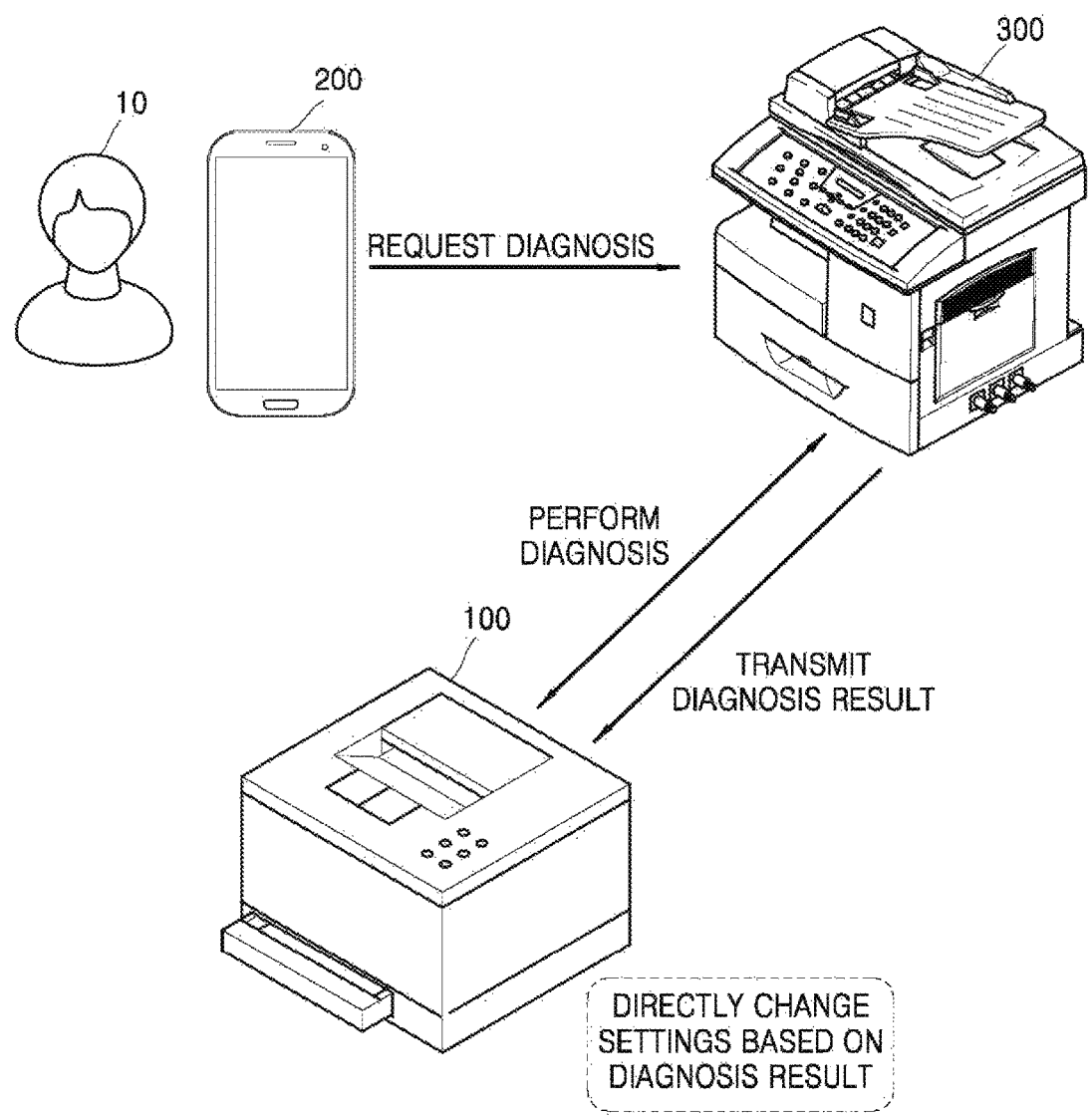
FIG. 5 is a diagram for describing a fax function diagnosis method and, more particularly, a diagram showing an embodiment in which a diagnosis server transmits a diagnosis result to an image forming apparatus according to an embodiment of the present disclosure.

FIG. 5 is a diagram for describing a fax function diagnosis method and, more particularly, a diagram showing an embodiment in which a diagnosis server transmits a diagnosis result to an image forming apparatus according to an embodiment of the present disclosure.

Referring to FIG. 5, a process in which the user 10 transmits a diagnosis request to the diagnosis server 300 by using the mobile device 200, and a process in which the diagnosis server 300 performs diagnosis by transmitting or receiving a test page to or from the image forming apparatus 100 are the same as those described above in relation to FIG. 4, and thus detailed descriptions thereof are not provided herein.

In the embodiment of FIG. 5, if a problem indicated by the diagnosis result is solvable by directly changing settings related to a fax function by the image forming apparatus 100, the diagnosis server 300 transmits the diagnosis result to the image forming apparatus 100. The diagnosis result may include a setting value to be changed to solve the problem, and the image forming apparatus 100 may automatically change the settings based on the setting value included in the diagnosis result after the diagnosis result is received.

Figure 6:
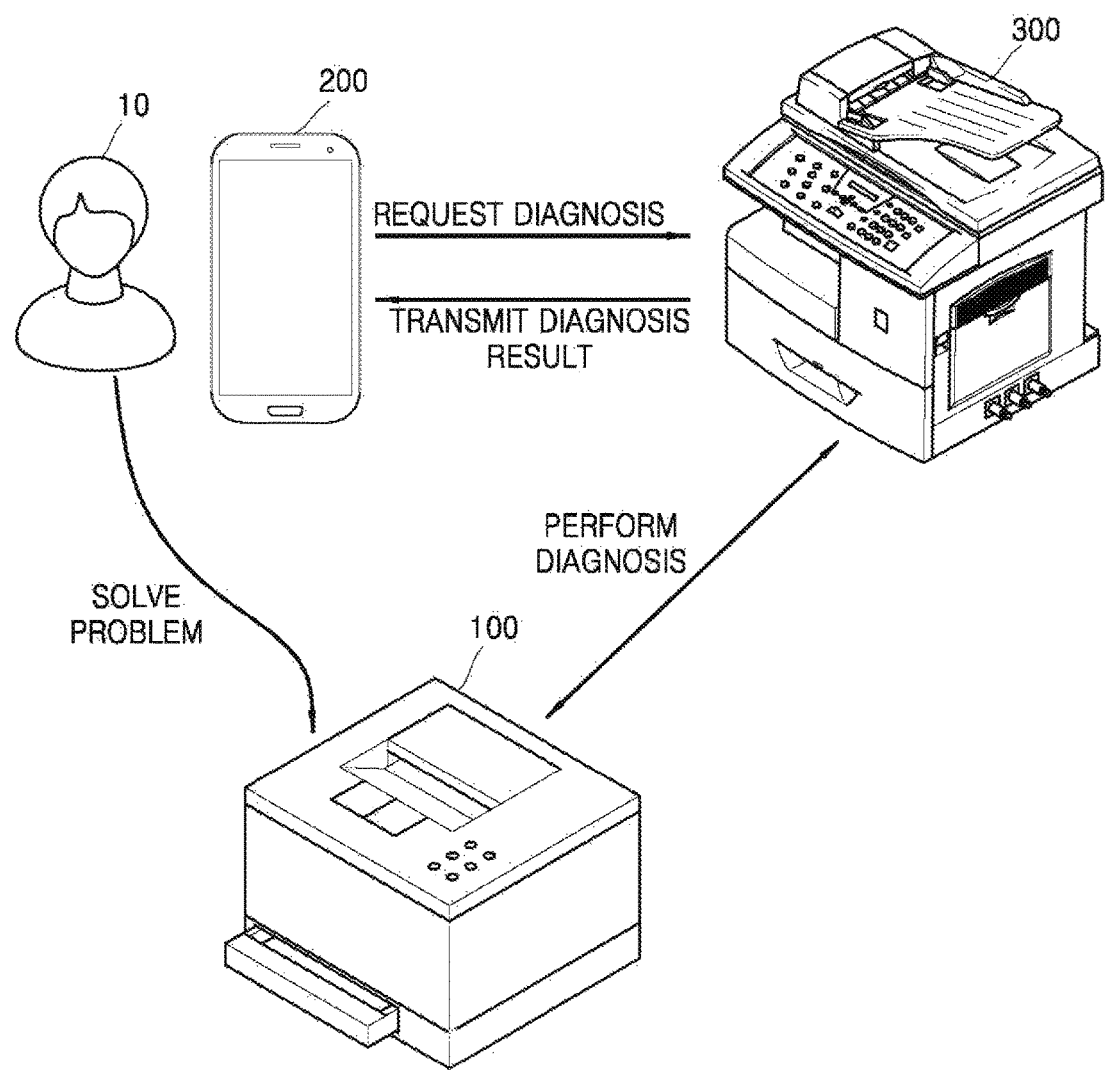
FIG. 6 is a diagram for describing a fax function diagnosis method and, more particularly, a diagram showing an embodiment in which a diagnosis server transmits a diagnosis result to a mobile device of a user according to an embodiment of the present disclosure.

FIG. 6 is a diagram for describing a fax function diagnosis method and, more particularly, a diagram showing an embodiment in which a diagnosis server transmits a diagnosis result to a mobile device 200 of the user 10 according to an embodiment of the present disclosure.

Referring to FIG. 6, a process in which the user 10 transmits a diagnosis request to the diagnosis server 300 by using the mobile device 200, and a process in which the diagnosis server 300 performs diagnosis by transmitting or receiving a test page to or from the image forming apparatus 100 are the same as those described above in relation to FIG. 4, and thus detailed descriptions thereof are not provided herein.

In the embodiment of FIG. 6, if a problem indicated by the diagnosis result is directly solvable by the user 10 of the image forming apparatus 100, the diagnosis server 300 transmits the diagnosis result to the mobile device 200 of the user 10. The diagnosis result may include information about the problem and a solution to the problem. The user 10 may check the diagnosis result by using the mobile device 200, and appropriately solve the problem of the image forming apparatus 100.

The diagnosis server 300 may transmit the diagnosis result to an email address used when the user 10 transmits the diagnosis request. In this case, the user 10 may check the diagnosis result by using the mobile device 200. The user 10 may print the received diagnosis result and scan the same by using the image forming apparatus 100, and the image forming apparatus 100 may check the diagnosis result and a setting value required to solve the problem by performing optical character recognition (OCR) on the scanned data, and automatically change settings based on the checked setting value.

Figure 7:
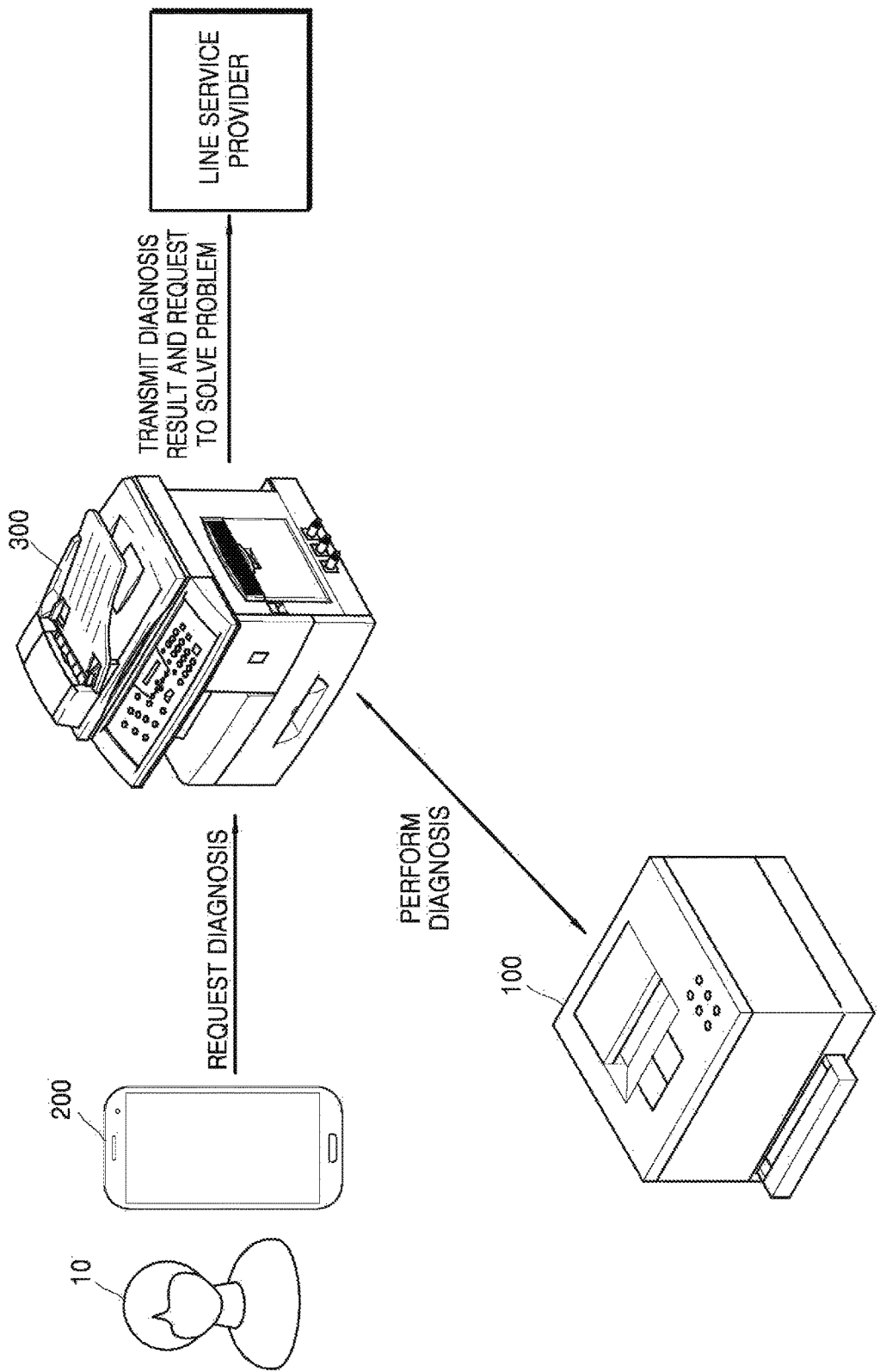
FIG. 7 is a diagram for describing a fax function diagnosis method and, more particularly, a diagram showing an embodiment in which a diagnosis server requests a service provider of a public switched telephone network (PSTN) to solve a problem according to an embodiment of the present disclosure.

FIG. 7 is a diagram for describing a fax function diagnosis method and, more particularly, a diagram showing an embodiment in which a diagnosis server requests a service provider of a PSTN to solve a problem according to an embodiment of the present disclosure.

Referring to FIG. 7, a process in which the user 10 transmits a diagnosis request to the diagnosis server 300 by using the mobile device 200, and a process in which the diagnosis server 300 performs diagnosis by transmitting or receiving a test page to or from the image forming apparatus 100 are the same as those described above in relation to FIG. 4, and thus detailed descriptions thereof are not provided herein.

In the embodiment of FIG. 7, if a problem indicated by the diagnosis result has occurred in the PSTN, the diagnosis server 300 transmits the diagnosis result to the service provider of the PSTN and requests the service provider to solve the problem.

Figure 8:
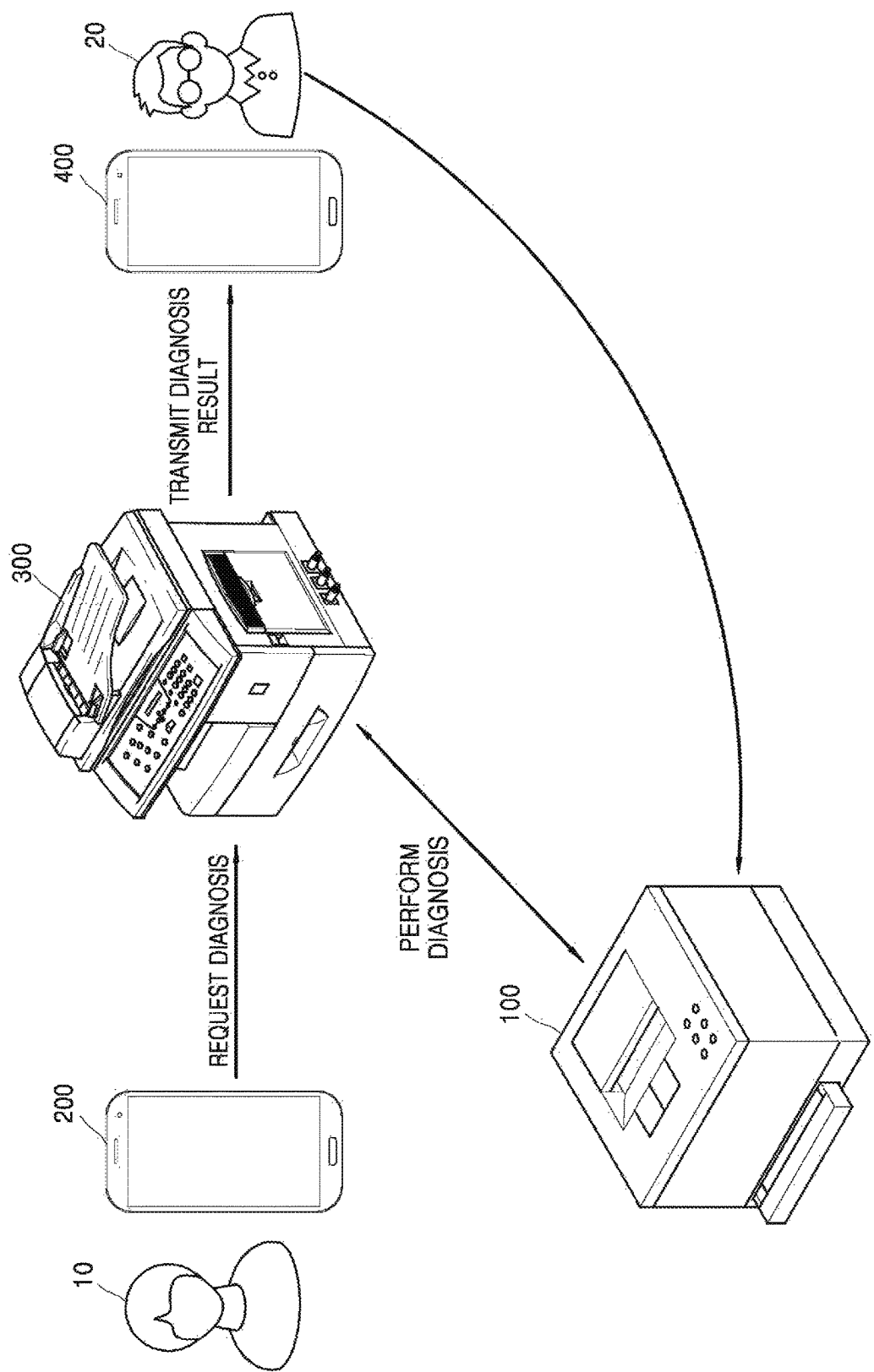
FIG. 8 is a diagram for describing a fax function diagnosis method and, more particularly, a diagram showing an embodiment in which a diagnosis server transmits a diagnosis result to a mobile device of a service engineer according to an embodiment of the present disclosure.

FIG. 8 is a diagram for describing a fax function diagnosis method and, more particularly, a diagram showing an embodiment in which a diagnosis server transmits a diagnosis result to a mobile device of a service engineer according to an embodiment of the present disclosure.

Referring to FIG. 8, a process in which the user 10 transmits a diagnosis request to the diagnosis server 300 by using the mobile device 200, and a process in which the diagnosis server 300 performs diagnosis by transmitting or receiving a test page to or from the image forming apparatus 100 are the same as those described above in relation to FIG. 4, and thus detailed descriptions thereof are not provided herein.

In the embodiment of FIG. 8, if a problem indicated by the diagnosis result is solvable by a service engineer 20, the diagnosis server 300 transmits the diagnosis result to a mobile device 400 of the service engineer 20. The service engineer 20 may check the diagnosis result by using the mobile device 400, and appropriately solve the problem of the image forming apparatus 100.

Figure 9:
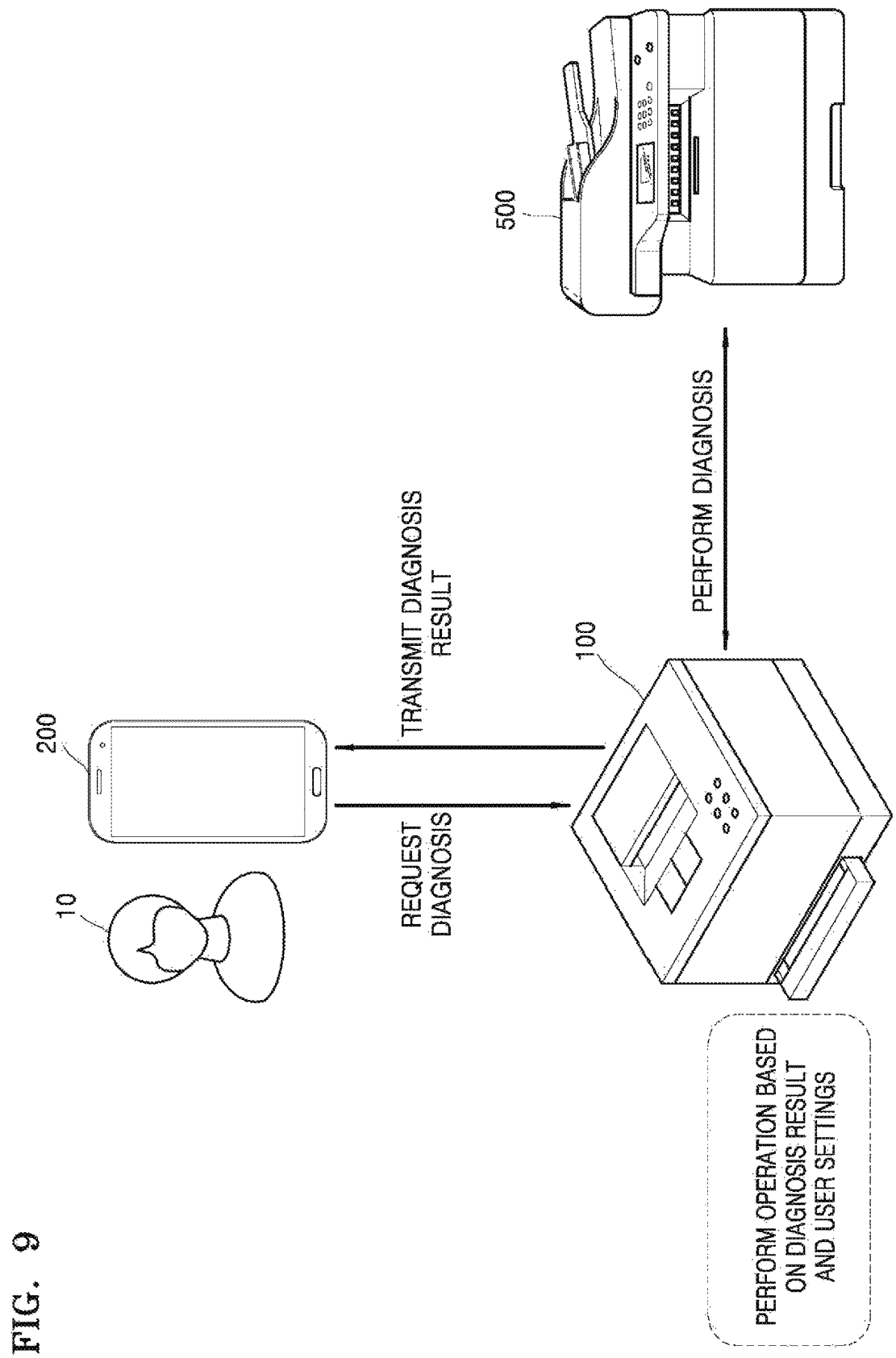
FIG. 9 is a diagram for describing a fax function diagnosis method and, more particularly, a diagram showing an embodiment in which an image forming apparatus subject to diagnosis diagnoses itself according to an embodiment of the present disclosure.

FIG. 9 is a diagram for describing a fax function diagnosis method and, more particularly, a diagram showing an embodiment in which an image forming apparatus subject to diagnosis diagnoses itself according to an embodiment of the present disclosure.

In the embodiment of FIG. 9, the image forming apparatus 100 is used as a diagnosis server. That is, a diagnosis server for diagnosing a fax function may be embedded in the image forming apparatus 100.

Referring to FIG. 9, the user 10 transmits a diagnosis request to the image forming apparatus 100 by using the mobile device 200. In this case, the mobile device 200 may transmit the diagnosis request to the image forming apparatus 100 via an email or an application as described above in relation to FIG. 4.

The image forming apparatus 100 having received the diagnosis request diagnoses itself by transmitting or receiving a test page to or from another image forming apparatus 500 having the fax function. When diagnosis is completed, the image forming apparatus 100 may check an occurring problem and a setting value for solving the problem, and change settings related to the fax function, based on the checked setting value.

Figure 10:
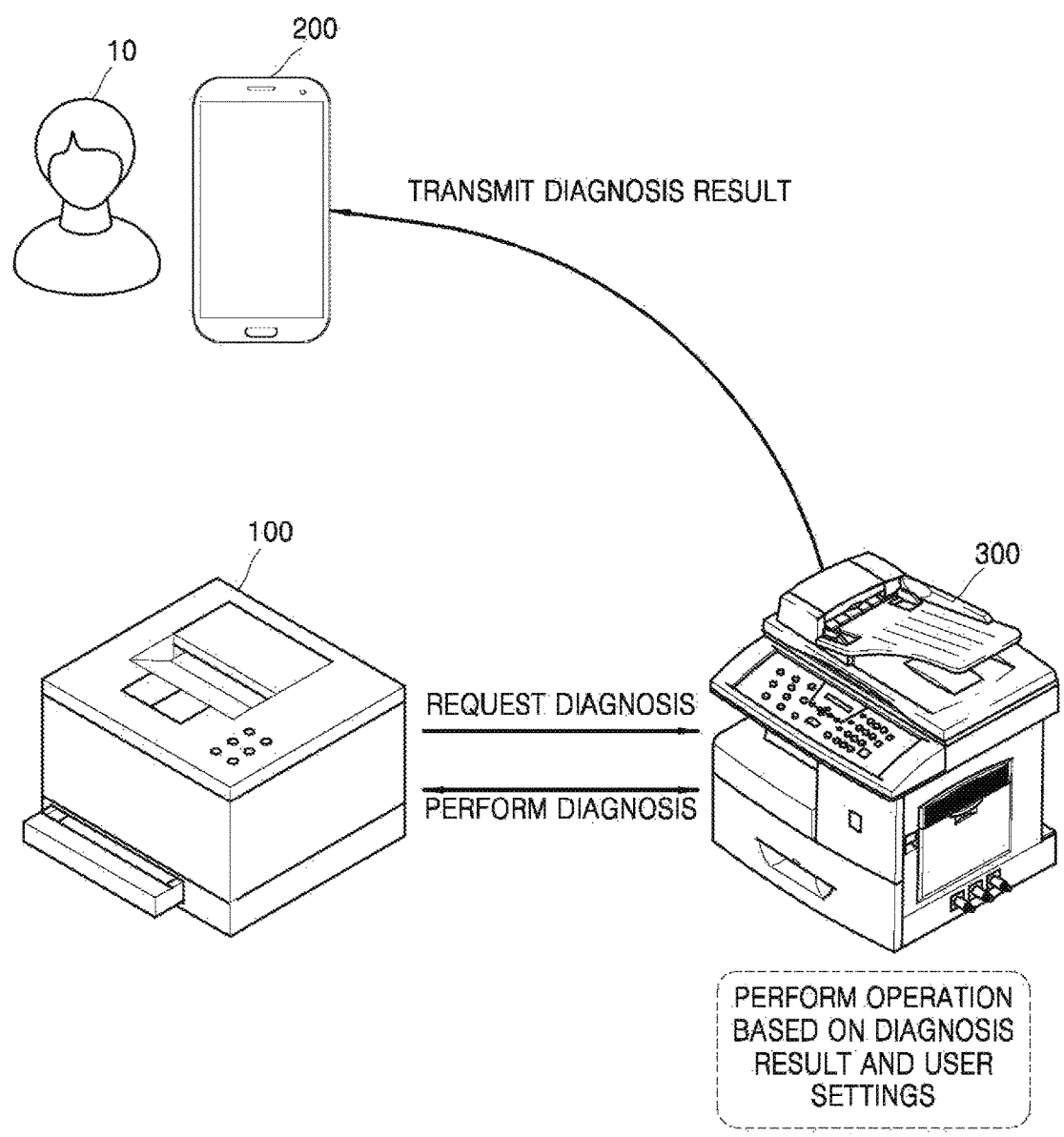
FIG. 10 is a diagram for describing a fax function diagnosis method and, more particularly, a diagram showing an embodiment in which an image forming apparatus subject to diagnosis transmits a diagnosis request to a diagnosis server according to an embodiment of the present disclosure.

FIG. 10 is a diagram for describing a fax function diagnosis method and, more particularly, a diagram showing an embodiment in which an image forming apparatus subject to diagnosis transmits a diagnosis request to a diagnosis server according to an embodiment of the present disclosure.

Referring to FIG. 10, when the user 10 inputs the diagnosis request through an input and output unit of the image forming apparatus 100, the image forming apparatus 100 may transmit the diagnosis request to the diagnosis server 300. In this case, if the image forming apparatus 100 supports email transmission, the image forming apparatus 100 may transmit the diagnosis request to the diagnosis server 300 via an email. Alternatively, the image forming apparatus 100 may transmit the diagnosis request to the diagnosis server 300 via an installed application.

When the diagnosis request is received, the diagnosis server 300 diagnoses a fax function by transmitting or receiving a test page to or from the image forming apparatus 100. When diagnosis is completed, the diagnosis server 300 may perform an operation based on the diagnosis result. For example, the diagnosis server 300 may transmit the diagnosis result to a mobile device of a user or a service engineer, transmit the diagnosis result to the image forming apparatus 100, or transmit a problem solution request to a service provider of a PSTN.

Fax function diagnosis methods will now be described with reference to FIGS. 11 to 13.

Figure 11:
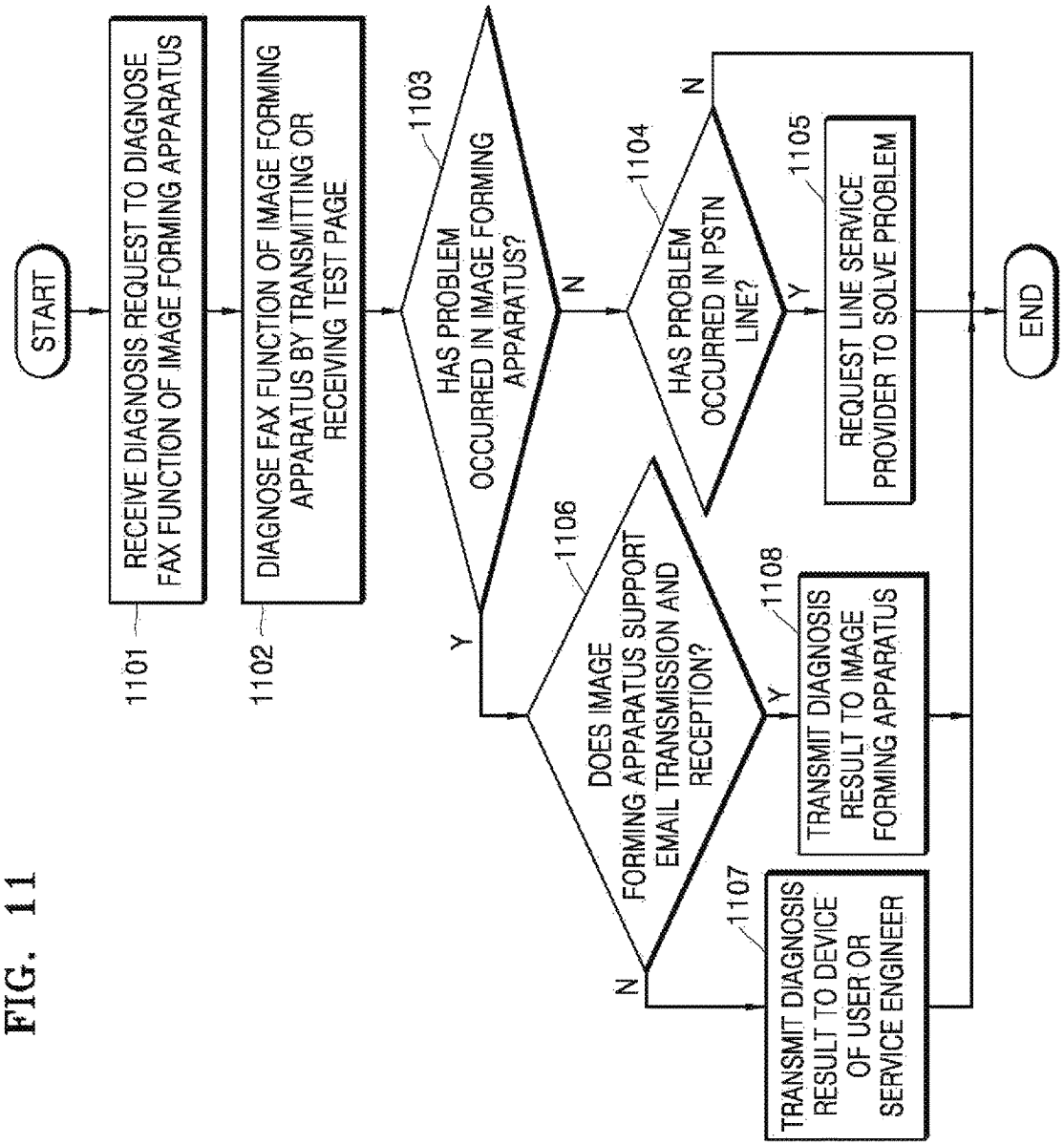
FIGS. 11, 12, and 13 are flowcharts of fax function diagnosis methods according to various embodiments of the present disclosure.
Figure 12:
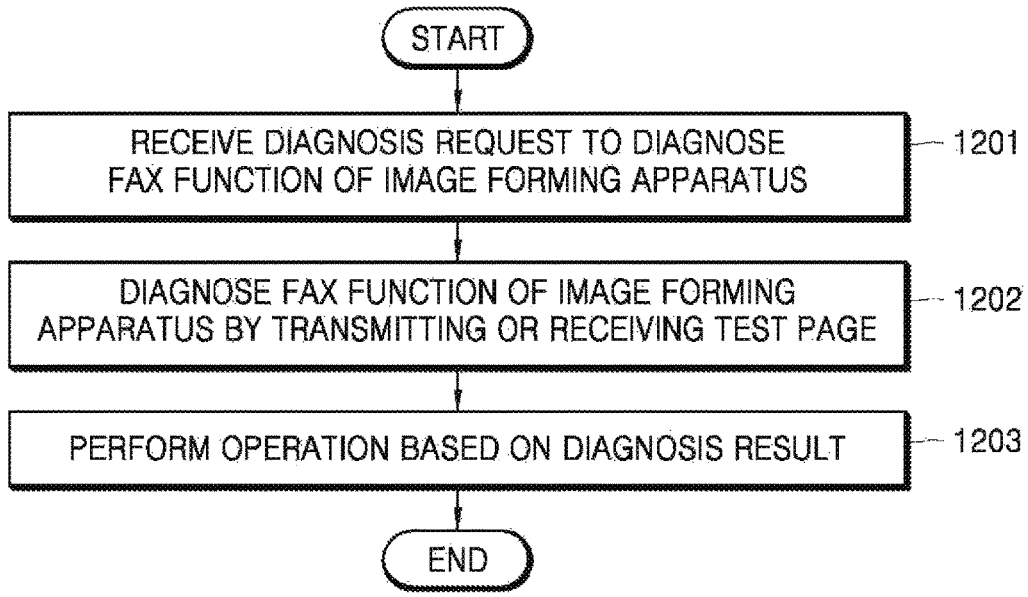
Figure 13:
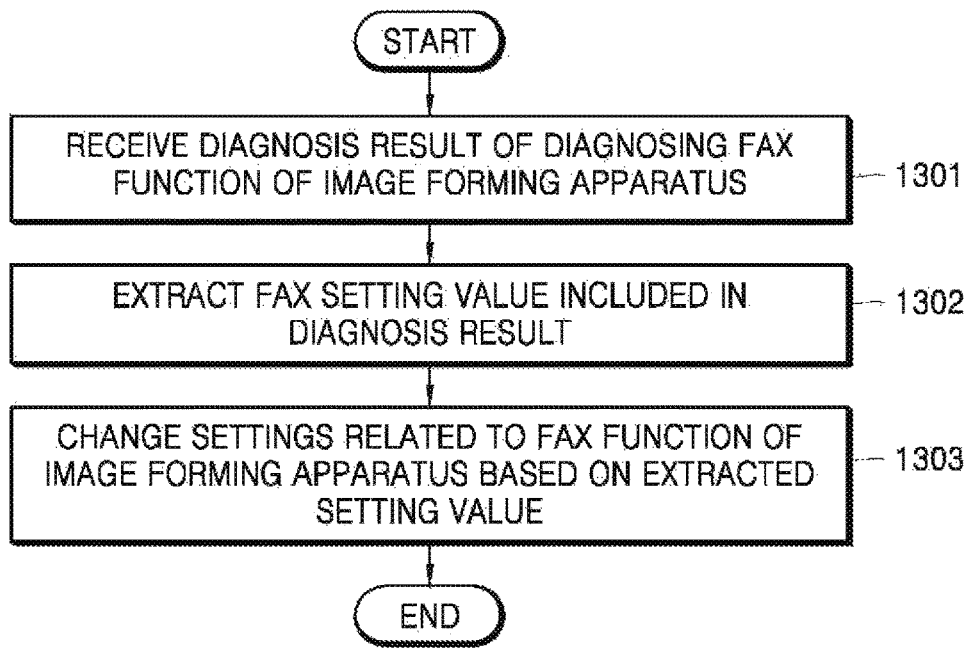

FIGS. 11, 12, and 13 are flowcharts of fax function diagnosis methods according to various embodiments of the present disclosure.

Referring to FIG. 11, in operation 1101, a diagnosis request to diagnose a fax function of an image forming apparatus is received. In this case, the diagnosis request may include a diagnosis item and a fax number of the image forming apparatus subject to diagnosis.

In operation 1102, the fax function of the image forming apparatus is diagnosed by transmitting or receiving a test page.

In operation 1103, it is determined whether a problem has occurred in the fax function of the image forming apparatus. Upon determining that a problem has occurred, the method proceeds to operation 1106 and it is determined whether the image forming apparatus supports email transmission and reception. Upon determining that the image forming apparatus does not support email transmission and reception, the method proceeds to operation 1107 and the diagnosis result is transmitted to a device of a user or a service engineer. Otherwise, upon determining that the image forming apparatus supports email transmission and reception, the method proceeds to operation 1108 and the diagnosis result is transmitted to the image forming apparatus.

Back in operation 1103, upon determining that a problem has not occurred, the method proceeds to operation 1104 and it is determined whether a problem has occurred in a PSTN. Upon determining that a problem has occurred in the PSTN, the method proceeds to operation 1105 and a service provider of the PSTN is requested to solve the problem. However, upon determining that a problem has not occurred in the PSTN, the method is terminated.

Referring to FIG. 12, in operation 1201, a diagnosis request to diagnose a fax function of an image forming apparatus is received.

In operation 1202, the fax function of the image forming apparatus is diagnosed by transmitting or receiving a test page.

In operation 1203, an operation based on the diagnosis result is performed.

Referring to FIG. 13, in operation 1301, a diagnosis result of diagnosing a fax function of an image forming apparatus is received.

In operation 1302, a setting value included in the diagnosis result is extracted from the diagnosis result. The diagnosis result may include information about an occurring problem and the setting value required to solve the problem.

In operation 1303, settings related to the fax function of the image forming apparatus are changed based on the extracted setting value.

According to the afore-described embodiments, a user may make a simple request to check a problem occurring in a fax machine, and an apparatus having performed diagnosis may automatically perform an operation for solving the occurring problem, thereby increasing user convenience.

The afore-described embodiments can also be embodied as a non-transitory computer-readable recording medium having recorded thereon computer-executable instructions and data. At least one of the instructions and data may be stored in the form of program code, and may configure a program module to perform an appropriate operation when executed by a processor.

Examples of the non-transitory computer-readable recording medium include magnetic storage media (e.g., hard disks) and optical recording media (e.g., compact discs (CDs) or digital versatile discs (DVDs)), or memories included in a server accessible through a network. For example, the non-transitory computer-readable recording medium may include at least one of the memory 140 of the image forming apparatus 100 and a memory of the input and output unit 110, or include the memory 240 of the mobile device 200 connected to the image forming apparatus 100 through a network.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A fax function diagnosis method comprising:
   receiving a diagnosis request to diagnose a fax function of an image forming apparatus, the diagnosis request being received in an email;
   diagnosing the fax function of the image forming apparatus by transmitting or receiving a test page; and
   performing an operation based on a result of the diagnosing,
   wherein a title of the email includes a diagnosis item and a fax number subject to diagnosis.

2. The fax function diagnosis method of claim 1, wherein the receiving of the diagnosis request comprises receiving the diagnosis request from the image forming apparatus or a mobile device.

3. The fax function diagnosis method of claim 1, wherein the performing of the operation based on the result comprises transmitting the result to the image forming apparatus if the result indicates that a problem solvable by the image forming apparatus directly changing settings has occurred.

4. The fax function diagnosis method of claim 1, wherein the performing of the operation based on the result comprises transmitting the result to a mobile device of a service engineer if the result indicates that a problem solvable by the service engineer has occurred.

5. The fax function diagnosis method of claim 1, wherein the performing of the operation based on the result comprises transmitting a problem solution request to a service provider of a public switched telephone network (PSTN) if the result indicates that a problem has occurred in the PSTN.

6. The fax function diagnosis method of claim 1, wherein the performing of the operation based on the result comprises transmitting the result to a mobile device of a user of the image forming apparatus if the result indicates that a problem directly solvable by the user has occurred.

7. The fax function diagnosis method of claim 1,
   wherein the diagnosing of the fax function comprises:
      extracting the diagnosis item and the fax number subject to diagnosis, by parsing the title of the email, and
      performing the diagnosis based on the extracted diagnosis item and the fax number.

8. The fax function diagnosis method of claim 1, wherein the diagnosis item indicates whether to diagnose the fax function of the image forming apparatus by the transmitting or the receiving of the test page.

9. A non-transitory computer-readable recording medium having recorded thereon a computer program for executing a fax function diagnosis method, the non-transitory computer-readable recording medium comprising:

instructions to receive a diagnosis request to diagnose a fax function of an image forming apparatus, the diagnosis request being received via an email;

instructions to diagnose the fax function of the image forming apparatus by transmitting or receiving a test page; and instructions to perform an operation based on a result of the diagnosing, wherein a title of the email includes a diagnosis item and a fax number subject to diagnosis.

10. A fax function diagnosis apparatus comprising:

a communicator to receive a diagnosis request to diagnose a fax function of an image forming apparatus, the diagnosis request being received via an email;

a fax transmitter/receiver to support a fax transmission and reception function; and at least one processor to:
control the fax transmitter/receiver to transmit or receive a test page to diagnose the fax function when the diagnosis request is received, and
perform an operation based on a result of the diagnosing,
wherein a title of the email includes a diagnosis item and a fax number subject to diagnosis.

11. The fax function diagnosis apparatus of claim 10, wherein the communicator is further to receive the diagnosis request from the image forming apparatus or a mobile device.

12. The fax function diagnosis apparatus of claim 10, wherein the at least one processor is further to transmit the result to the image forming apparatus through the communicator if the result indicates that a problem solvable by the image forming apparatus directly changing settings has occurred.

13. The fax function diagnosis apparatus of claim 10, wherein the at least one processor is further to transmit the result to a mobile device of a service engineer through the communicator if the result indicates that a problem solvable by the service engineer has occurred.

14. The fax function diagnosis apparatus of claim 10, wherein the at least one processor is further to transmit a problem solution request to a service provider of a public switched telephone network (PSTN) through the communicator if the result indicates that a problem has occurred in the PSTN.

15. The fax function diagnosis apparatus of claim 10, wherein the at least one processor is further to transmit the result to a mobile device of a user of the image forming apparatus through the communicator if the result indicates that a problem directly solvable by the user has occurred.

16. The fax function diagnosis apparatus of claim 10, wherein the at least one processor is further to:
extract the diagnosis item and the fax number subject to diagnosis, by parsing the title of the email, and
perform the diagnosis based on the extracted diagnosis item and the fax number.

17. The fax function diagnosis apparatus of claim 16, wherein the diagnosis request is received via the email when it is determined that the image forming apparatus supports transmission and reception of the email.

18. The fax function diagnosis apparatus of claim 10, wherein the diagnosis item indicates whether to diagnose the fax function of the image forming apparatus by the transmitting or the receiving of the test page.

* * * * *